United States Patent
Wagh et al.

(10) Patent No.: US 11,245,604 B2
(45) Date of Patent: Feb. 8, 2022

(54) TECHNIQUES TO SUPPORT MULTIPLE INTERCONNECT PROTOCOLS FOR A COMMON SET OF INTERCONNECT CONNECTORS

(71) Applicant: INTEL CORPORATION, Santa Clara, CA (US)

(72) Inventors: Mahesh Wagh, Portland, OR (US); Mark S. Myers, Portland, OR (US); Stephen R. Van Doren, Portland, OR (US); Dimitrios Ziakas, Portland, OR (US); Bassam N. Coury, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/951,723

(22) Filed: Nov. 18, 2020

(65) Prior Publication Data

US 2021/0109300 A1    Apr. 15, 2021

Related U.S. Application Data

(63) Continuation of application No. 15/396,501, filed on Dec. 31, 2016, now Pat. No. 10,884,195.
(Continued)

(51) Int. Cl.
*G06F 3/06* (2006.01)
*G06F 13/40* (2006.01)
(Continued)

(52) U.S. Cl.
CPC ............ *H04L 43/08* (2013.01); *G02B 6/3882* (2013.01); *G02B 6/3893* (2013.01);
(Continued)

(58) Field of Classification Search
CPC ... H04L 43/08; H04L 41/145; H04L 43/0817; H04L 43/0876; H04L 43/0894;
(Continued)

(56) References Cited

U.S. PATENT DOCUMENTS

| 2006/0294272 | A1* | 12/2006 | Chou | G06K 19/07733 |
| | | | | 710/62 |
| 2010/0045493 | A1* | 2/2010 | Fahmi | H03M 9/00 |
| | | | | 341/100 |
| 2016/0306763 | A1* | 10/2016 | Geva | G06F 13/4022 |

OTHER PUBLICATIONS

Anonymous: "BIOS—Wikipedia", Jun. 22, 2016, XP055830640, URL: https://en.wikipedia.org/w/index.php?title=BIOS&oldid=726438579 [retrieved on Aug. 6, 2021].

* cited by examiner

*Primary Examiner* — Idriss N Alrobaye
*Assistant Examiner* — Ronald T Modo
(74) *Attorney, Agent, or Firm* — Kacvinsky Daisak Bluni PLLC

(57) ABSTRACT

Embodiments may be generally direct to apparatuses, systems, method, and techniques to determine a configuration for a plurality of connectors, the configuration to associate a first interconnect protocol with a first subset of the plurality of connectors and a second interconnect protocol with a second subset of the plurality of connectors, the first interconnect protocol and the second interconnect protocol are different interconnect protocols and each comprising one of a serial link protocol, a coherent link protocol, and an accelerator link protocol, cause processing of data for communication via the first subset of the plurality of connectors in accordance with the first interconnect protocol, and cause processing of data for communication via the second subset of the plurality of connector in accordance with the second interconnect protocol.

24 Claims, 11 Drawing Sheets

Related U.S. Application Data

(60) Provisional application No. 62/427,268, filed on Nov. 29, 2016, provisional application No. 62/376,859, filed on Aug. 18, 2016, provisional application No. 62/365,969, filed on Jul. 22, 2016.

(51) Int. Cl.

| | | |
|---|---|---|
| G06F 13/16 | (2006.01) | |
| H04L 12/26 | (2006.01) | |
| G06F 16/901 | (2019.01) | |
| H04B 10/25 | (2013.01) | |
| G02B 6/38 | (2006.01) | |
| G02B 6/42 | (2006.01) | |
| G02B 6/44 | (2006.01) | |
| G06F 1/18 | (2006.01) | |
| G06F 1/20 | (2006.01) | |
| G06F 8/65 | (2018.01) | |
| G06F 9/30 | (2018.01) | |
| G06F 9/4401 | (2018.01) | |
| G06F 9/54 | (2006.01) | |
| G06F 12/109 | (2016.01) | |
| G06F 12/14 | (2006.01) | |
| G08C 17/02 | (2006.01) | |
| G11C 5/02 | (2006.01) | |
| G11C 7/10 | (2006.01) | |
| G11C 11/56 | (2006.01) | |
| G11C 14/00 | (2006.01) | |
| H03M 7/30 | (2006.01) | |
| H03M 7/40 | (2006.01) | |
| H04L 12/24 | (2006.01) | |
| H04L 12/931 | (2013.01) | |
| H04L 12/947 | (2013.01) | |
| H04L 29/08 | (2006.01) | |
| H04L 29/06 | (2006.01) | |
| H04Q 11/00 | (2006.01) | |
| H05K 7/14 | (2006.01) | |
| G06F 15/16 | (2006.01) | |
| G06F 9/38 | (2018.01) | |
| G06F 9/50 | (2006.01) | |
| H04L 12/851 | (2013.01) | |
| H04L 12/811 | (2013.01) | |
| H05K 5/02 | (2006.01) | |
| H04W 4/80 | (2018.01) | |
| G06Q 10/08 | (2012.01) | |
| G06Q 10/00 | (2012.01) | |
| G06Q 50/04 | (2012.01) | |
| H04J 14/00 | (2006.01) | |
| H04L 12/911 | (2013.01) | |
| B25J 15/00 | (2006.01) | |
| B65G 1/04 | (2006.01) | |
| H05K 7/20 | (2006.01) | |
| H04L 12/939 | (2013.01) | |
| H04W 4/02 | (2018.01) | |
| H04L 12/751 | (2013.01) | |
| G06F 13/42 | (2006.01) | |
| H05K 1/18 | (2006.01) | |
| G05D 23/19 | (2006.01) | |
| G05D 23/20 | (2006.01) | |
| H04L 12/927 | (2013.01) | |
| H05K 1/02 | (2006.01) | |
| H04L 12/781 | (2013.01) | |
| H04Q 1/04 | (2006.01) | |
| G06F 12/0893 | (2016.01) | |
| H05K 13/04 | (2006.01) | |
| G11C 5/06 | (2006.01) | |
| G06F 11/14 | (2006.01) | |
| G06F 11/34 | (2006.01) | |
| G06F 12/0862 | (2016.01) | |
| G06F 15/80 | (2006.01) | |
| H04L 12/919 | (2013.01) | |
| G06F 12/10 | (2016.01) | |
| G06Q 10/06 | (2012.01) | |
| G07C 5/00 | (2006.01) | |
| H04L 12/28 | (2006.01) | |
| H04L 29/12 | (2006.01) | |
| H04L 9/06 | (2006.01) | |
| H04L 9/14 | (2006.01) | |
| H04L 9/32 | (2006.01) | |
| H04L 12/933 | (2013.01) | |

(52) U.S. Cl.
CPC ......... *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01); *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 15/161* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F*

2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/06 (2013.01); G06Q 10/06314 (2013.01); G06Q 10/087 (2013.01); G06Q 10/20 (2013.01); G06Q 50/04 (2013.01); G07C 5/008 (2013.01); G08C 2200/00 (2013.01); G11C 5/06 (2013.01); H03M 7/30 (2013.01); H03M 7/3084 (2013.01); H03M 7/40 (2013.01); H03M 7/4031 (2013.01); H03M 7/6005 (2013.01); H03M 7/6023 (2013.01); H04B 10/25 (2013.01); H04J 14/00 (2013.01); H04L 9/0643 (2013.01); H04L 9/14 (2013.01); H04L 9/3247 (2013.01); H04L 9/3263 (2013.01); H04L 12/2809 (2013.01); H04L 29/12009 (2013.01); H04L 41/024 (2013.01); H04L 41/046 (2013.01); H04L 41/082 (2013.01); H04L 41/0813 (2013.01); H04L 41/0896 (2013.01); H04L 41/12 (2013.01); H04L 41/147 (2013.01); H04L 41/5019 (2013.01); H04L 43/065 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/15 (2013.01); H04L 49/555 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/34 (2013.01); H04Q 1/04 (2013.01); H04Q 11/00 (2013.01); H04Q 11/0005 (2013.01); H04Q 11/0062 (2013.01); H04Q 11/0071 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/023 (2013.01); H04W 4/80 (2018.02); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1485 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); H05K 2201/066 (2013.01); H05K 2201/10121 (2013.01); H05K 2201/10159 (2013.01); H05K 2201/10189 (2013.01); Y02D 10/00 (2018.01); Y02P 90/30 (2015.11); Y04S 10/50 (2013.01); Y04S 10/52 (2013.01); Y10S 901/01 (2013.01)

(58) Field of Classification Search
CPC ....... H04L 49/00; H04L 49/25; H04L 49/357; H04L 49/45; H04L 67/02; H04L 67/306; H04L 69/04; H04L 69/329; H04L 43/065; H04L 41/12; H04L 41/5019; H04L 43/16; H04L 47/24; H04L 47/38; H04L 67/1004; H04L 67/1034; H04L 67/1097; H04L 67/12; H04L 67/16; H04L 41/147; H04L 67/1008; H04L 41/0813; H04L 67/1029; H04L 41/0896; H04L 47/823; H04L 47/782; H04L 41/082; H04L 67/34; H04L 67/1012; H04L 49/555; H04L 67/10; H04L 45/02; H04L 47/805; H04L 45/52; H04L 47/765; H04L 67/1014; H04L 12/2809; H04L 29/12009; H04L 41/024; H04L 9/0643; H04L 9/14; H04L 9/3247; H04L 9/3263; H04L 47/82; H04L 41/046; H04L 49/15; H04L 49/35; G06F 15/161; G06F 16/9014; G06F 1/183; G06F 1/20; G06F 3/0613; G06F 3/0625; G06F 3/064; G06F 3/0653; G06F 3/0655; G06F 3/0664; G06F 3/0665; G06F 3/0673; G06F 3/0679; G06F 3/0683; G06F 3/0688; G06F 3/0689; G06F 8/65; G06F 9/30036; G06F 9/4401; G06F 9/544; G06F 12/109; G06F 12/1408; G06F 13/1668; G06F 13/4068; G06F 13/409; G06F 2212/1008; G06F 2212/1044; G06F 2212/152; G06F 2212/202; G06F 2212/401; G06F 2212/402; G06F 2212/7207; G06F 3/0616; G06F 3/0619; G06F 3/0631; G06F 3/0638; G06F 3/0647; G06F 3/067; G06F 9/3887; G06F 9/5016; G06F 9/5072; G06F 2209/5019; G06F 2209/5022; G06F 2212/1024; G06F 2212/1041; G06F 3/061; G06F 3/0659; G06F 3/0658; G06F 9/505; G06F 3/0611; G06F 13/4282; G06F 9/5044; G06F 12/0893; G06F 13/42; G06F 13/1694; G06F 11/141; G06F 11/3414; G06F 12/0862; G06F 15/8061; G06F 9/5077; G06F 12/10; G06F 13/161; G06F 13/4022; G06F 3/065; G06F 13/385; G06F 9/4881; G06F 2209/483; G06F 9/5027; G06F 12/0238; H04B 10/25891; H04B 10/25; G02B 6/3882; G02B 6/3893; G02B 6/3897; G02B 6/4292; G02B 6/4452; G11C 5/02; G11C 7/1072; G11C 11/56; G11C 14/0009; G11C 5/06; H03M 7/3086; H03M 7/4056; H03M 7/4081; H03M 7/4031; H03M 7/6005; H03M 7/6023; H03M 7/30; H04Q 11/0003; H04Q 2011/0037; H04Q 11/0071; H04Q 2011/0041; H04Q 2011/0052; H04Q 2011/0073; H04Q 2011/0079; H04Q 2011/0086; H04Q 2213/13523; H04Q 2213/13527; H04Q 11/0062; H04Q 1/04; H04Q 1/09; H05K 7/1442; H05K 2201/10189; H05K 5/0204; H05K 7/1485; H05K 7/1489; H05K 7/1491; H05K 2201/066; H05K 2201/10121; H05K 2201/10159; H05K 7/1498; H05K 7/20736; H05K 1/181; H05K 7/2039; H05K 7/20709; H05K 7/1418; H05K 7/1461; H05K 7/20727;

H05K 7/20745; H05K 7/20836; H05K 1/0203; H05K 7/1487; H05K 13/0486; H05K 7/1421; H05K 7/1422; H05K 7/1447; H04J 14/00; Y04S 10/52; Y02P 90/30; H04W 4/80; H04W 4/023; G06Q 10/087; G06Q 10/20; G06Q 50/04; G06Q 10/06; G06Q 10/06314; G08C 2200/00; Y10S 901/01; Y10S 901/30; B25J 15/0014; B65G 1/0492; G05D 23/1921; G05D 23/2039; G07C 5/008

See application file for complete search history.

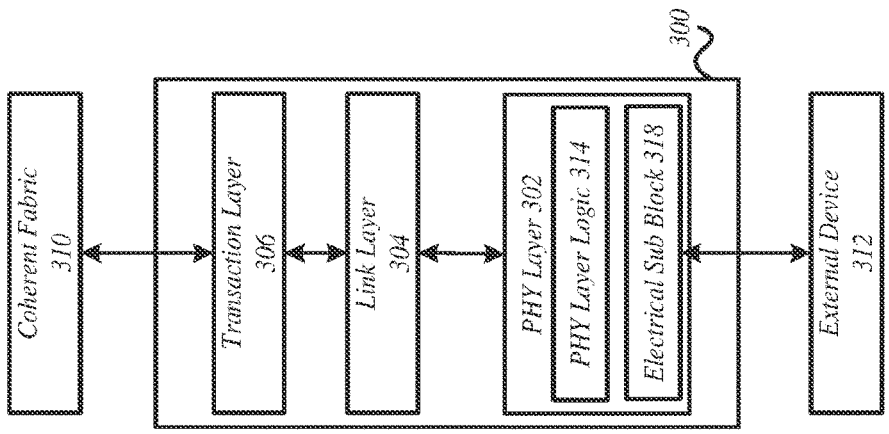

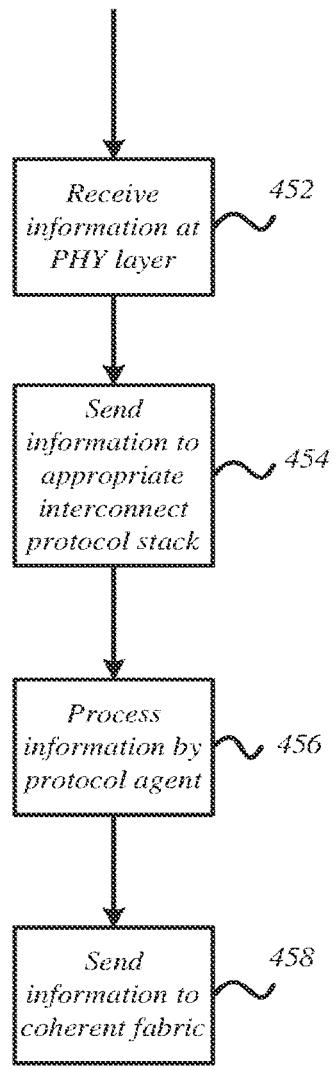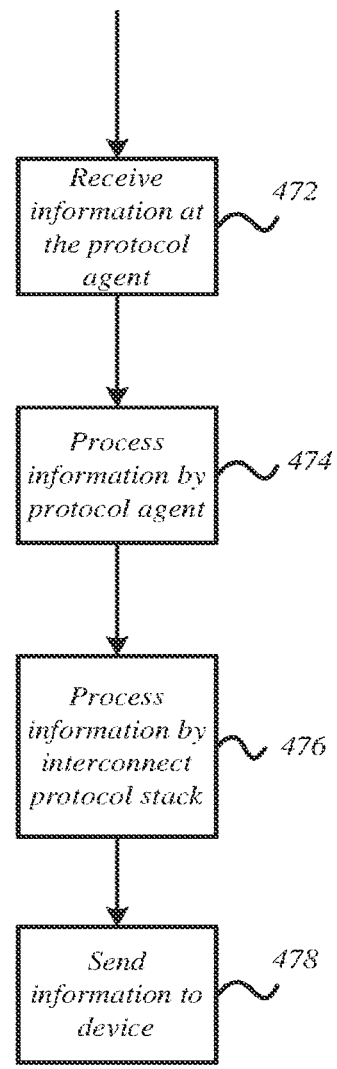
*FIG. 4B*

500

SENDING AND RECEIVING DATA VIA THE PLURALITY OF CONNECTORS OF A PHY LAYER INTERFACE

_505_

CAUSING PROCESSING OF THE DATA FOR COMMUNICATION VIA A FIRST SUBSET OF THE PLURALITY OF CONNECTORS IN ACCORDANCE WITH A FIRST INTERCONNECT PROTOCOL AND CAUSING PROCESSING OF THE DATA FOR COMMUNICATION VIA A SECOND SUBSET OF THE PLURALITY OF CONNECTOR IN ACCORDANCE WITH A SECOND INTERCONNECT PROTOCOL, THE FIRST INTERCONNECT PROTOCOL AND THE SECOND INTERCONNECT PROTOCOL ARE DIFFERENT PROTOCOLS AND EACH COMPRISING ONE OF A SERIAL LINK PROTOCOL, A COHERENT LINK PROTOCOL, AND AN ACCELERATOR LINK PROTOCOL

TECHNIQUES TO SUPPORT MULTIPLE INTERCONNECT PROTOCOLS FOR A COMMON SET OF INTERCONNECT CONNECTORS

RELATED CASES

This application claims priority to U.S. Provisional Patent Application No. 62/365,969, filed Jul. 22, 2016, U.S. Provisional Patent Application No. 62/376,859, filed Aug. 18, 2016, and United Provisional Patent Application No. 62/427,268, filed Nov. 29, 2016, each of which are hereby incorporated by reference in their entirety.

TECHNICAL FIELD

Embodiments described herein generally include techniques to support multiple interconnect protocols for a common set of interconnect connectors.

BACKGROUND

As computing systems are advancing, the components therein are becoming more complex. As a result, the interconnect architecture to couple and communicate between the components is also increasing in complexity to ensure bandwidth and latency requirements are met for optimal component operation. Furthermore, different market segments need different interconnect architectures to suit the market's needs and different interconnect connections. For example, these computing systems may provide various processing capabilities that require different add-in cards having physical resources. These add-in cards that may be coupled with the baseboard and may require any number of different interconnect protocols. However, connector space on the baseboard may be limited and a single connector typical supports on a single or limited number of interconnect protocols. Thus, embodiments may be directed to solving these and other problems.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3A illustrates an example of an interconnect protocol layer system.

FIG. 4B illustrates an example of second and third logic flow diagrams.

FIG. 5 illustrates an example of a forth flow diagram.

DETAILED DESCRIPTION

Figure 1:
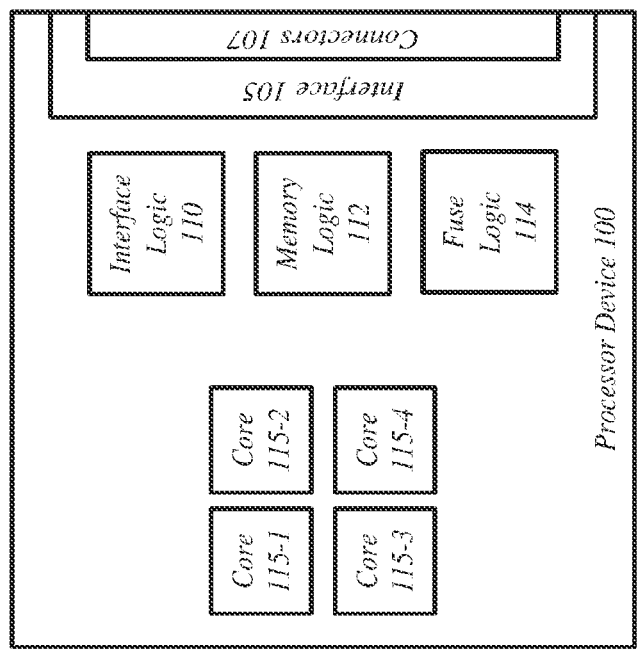
FIG. 1 illustrates an example of a processor device.

Various embodiments may be generally directed to providing multiple interconnect protocols for a common set of interconnect connectors. For example, embodiments may include determining a configuration for a plurality of connectors, the configuration to associate a first interconnect protocol with a first subset of the plurality of connectors and a second interconnect protocol with a second subset of the plurality of connectors. In some instances, the configuration may associate an interconnect protocol, such as a serial link protocol, a coherent link protocol, and/or an accelerator link protocol, with the first and second subset of connector. The configuration may be based on the setting of one or more fuses, an auto discovery operation, and platform straps, as will be discussed in more detail below.

Further, embodiments causing processing of data for communication via the first subset of the plurality of connectors in accordance with the first interconnect protocol and causing processing of data for communication via the second subset of the plurality of connector in accordance with the second interconnect protocol. Said differently, embodiments include directing data for processing by a particular interconnect protocol stack based on the configuration. The interconnect protocol stacks may be specific to the interconnect protocol. Examples of interconnect protocol stacks may include a serial link protocol stack, a coherent link protocol stack, and an accelerator link protocol. Thus, embodiments including processing data using one of these or other interconnect protocols based on the configuration of the connectors. Moreover, embodiments may include sending and receiving data via the plurality of connectors based on a configuration. Embodiments are not limited in this manner. These and other details will become more apparent in the following description.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates a general overview of a processor device 100 which may be part of the system, such as a computer system, compute system, networking system, distributed system, and so forth. In some instances, the processor device 100 may be any type of computational element, such as but not limited to, a microprocessor, a processor, central processing unit, digital signal processing unit, dual-core processor, a quad-core processor, a multi-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, a field-programmable gate array (FPGA) circuit, application specific integrated circuit (ASIC) or any other type of processor or processing circuit on a single chip or integrated circuit. The processor device 100 may have a number of elements, including one or more cores 115, interface logic 110, memory logic 112, fuse logic 114, and one or more interfaces 105 having a number of connectors 107.

In the illustrated example, the processor device 100 includes four cores 115-1 through 115-4. However, embodiments are not limited in this manner, and the processor device 100 may include any number of cores including a single core. Moreover, the multiple core design can integrate different types of processor cores on the same integrated circuit (IC) die, e.g. in a heterogeneous design. Thus, the one or more cores 115-1 through 115-4 may be different from each other. In some instances, each core of the multiple core design may be the same in a homogeneous.

The cores 115 of the processor device 100 can read and execute program instructions. The instructions are typically central processing unit CPU instructions (such as add, move data, and branch). The multiple core design enables the processor device 100 to execute or run multiple instructions at the same time, increasing overall speed for programs and applications. In some instances, the cores 115 may be integrated onto a single integrated circuit die (known as a chip multiprocessor or CMP), or onto multiple dies in a single chip package. Also, the processor device 100 with a multiple core design can be implemented as symmetrical or asymmetrical multiprocessors.

In some embodiments, the processor device 100 includes an interface 105 and connectors 107. The connectors 107 and interface 105 may provide physical connections to couple with other devices, such as interface components, memory, processing cards, networking interface components, accelerator cards, and so forth. The interface 105 and connectors 107 can include one or more wires or signal traces capable of communicating information and data via electrical signaling. In some instances, the interface 105 and connectors 107 may be coupled with a physical slot capable of accepting processing cards. These processing cards typically provide additional processing and memory, which may be directed to a specific task, e.g. graphics processing, network processing, storage processing, interface processing, and so forth. As will be discussed in more detail below, the interface 105 and connectors 107 provide a common set of pins that support communication via a number of interconnect protocols.

In embodiments, the interface 105 and connectors 107 may be part of and enable one or more interconnects or logical links to send and receive data. The information and data communicated via the interconnect, and logical links may include data, control messages, interrupts, and so forth. These interconnect include a number or lanes, such as signaling pairs, and each lane may be made up of four wires or signal traces of the connectors 107 to send and receive data with another device, for example. Embodiments are not limited in this manner. In other words, each connector 107 may be coupled to a single wire or trace and four connectors 107 may make up a lane. In one example, the interface 105 may include a total of twenty-six (26) lanes to communicate data with another device. However, embodiments are not limited in this manner, and an interface may include more or fewer lanes based on computing requirements, for example.

The processor device 100 also includes interface logic 110 to enable and cause communication of data via the interface 105 in accordance with one or more of the interconnect protocols, such as a serial link protocol, a coherent link protocol, an accelerator link protocol, or any other interconnect protocol. Examples of a serial link protocol may include a Peripheral Component Interconnect Express (PCIe or PCI-E) protocol, PCI protocol, Universal Serial Bus (USB) protocol, Serial Peripheral Interface (SPI) protocol, Serial AT Attachment (SATA) protocol, and any other protocol for communicating serially via a link. Examples of a coherent link protocol may include a high performance interconnect link protocol, such as Intel's® QuickPath Interconnect (QPI) protocol and Intel's UltraPath Interconnect (UPI) protocol, and so forth. Further, examples of an accelerator link protocol may include Intel's® Optimized Accelerator Protocol (OAP), a networking accelerator protocol, a storage accelerator protocol, a display accelerator protocol, and so forth. Embodiments are not limited to these examples. In some embodiments, the interface logic 110 may include a multiplexer such that a common set of the connectors 107 of the interface 105 supports the interconnect protocols. Thus, different devices or cards requiring different interconnect protocols may use same interface 105 and connectors 107.

In some embodiments, the interface logic 110 may be configured such that the lanes of the interface 105 are capable of communicating via one or more of the interconnect protocols, such as one or more of the serial link protocols, the coherent link protocols, and the accelerator link protocols. Moreover, and in some instances, the interface logic 110 may enable and cause communications via the interface 105 and the connectors 107 in accordance with more than one interconnect protocol at a time. For example, a first subset of the connectors 107 may be configured by the interface logic 110 to communicate in accordance with a first interconnect protocol while a second subset of the connectors 107 may be configured by the interface logic 110 to communicate in accordance with a second interconnect protocol. The second interconnect protocol may be different than the first interconnect protocol. In another example, a third subset of the connectors 107 may be configured by the interface logic 110 to communicate in accordance with a third interconnect protocol. The third interconnect protocol may be different than the first and the second interconnect protocols.

In embodiments, the interconnect protocol used for communication via specific connectors 107 may be programmed by a user or a computer system statically, or dynamically. Further, the programming may occur by setting one or more fuses via the fuse logic 114 to configure the interface logic 110, for example. In some instances, the interconnect protocol for use by the interface logic 110 may be originally programmed at the time of manufacture, during startup of a compute system, or during run-time. Embodiments are not limited in this manner.

In embodiments, the interface logic 110 may be reprogrammed to reprovision one or more of the connectors 107 of the interface 105 from one interconnect protocol to another interconnect protocol. For example, the interface logic 110 may be reprogrammed or set such that one or more connectors 107 currently operating in accordance with a serial link protocol may be reprogrammed to operate in accordance with a coherent link protocol or an accelerator link protocol. In another example, the interface logic 110 may be reprogrammed such that one or more connectors 107 programmed to operate in accordance with a coherent link protocol operate in accordance with a serial link protocol or an accelerator link protocol. In a third example, the interface logic 110 may be reprogrammed such that one or more connectors 107 currently operating in accordance with an accelerator link protocol may operate in accordance with a coherent link protocol or a serial link protocol. Note that the programming and reprogramming may occur at the interface logic 110, at the interface 105, at the connector 107, or some combination thereof. In other words, setting and configurations changes may occur at any of the above-mentioned elements, e.g. interface logic 110, interface 105, and connectors 107. Thus, the same set of connectors 107 or pins may support different connection types and provide communication via different interconnect protocols based on the interface logic 110. Embodiments are not limited to these examples.

In some embodiments, the interface logic 110 may be statically and dynamically programmed and reprogrammed to support the interconnect protocols for the connectors 107 or a portion thereof. In one example, the interface logic 110 may be programmed to operate in accordance with one or more of the interconnect protocols at the time of manufacturing and may not be changed once programmed. The interface logic 110 may be programmed based on the needs of the manufacturer and the devices incorporated in a computer system, for example. In another example, the interface logic 110 may be programmed at bootup or run-time of a computing system, e.g. initialization performed by a Basic Input/Output System (BIOS), startup or operation of an operating system, during application run-time, etc. This programming may occur during the first time a computer system boots/loads or during the first time a device is detected when coupled with one or more of the connectors 107, for example. In another example, the interface logic 110 may be reprogrammed while a compute system is running or operating based on a different device being coupled to one or more of the connectors 107. Embodiments are not limited in this manner.

The one or more connectors 107 may be programmed, statically and dynamically, by a user and by a computer system, as previously mentioned. For example, a graphical user interface (GUI) may be presented by a BIOS, operating system, or application to enable a user to set one or more interconnect protocols for one or more of the connectors 107. In some embodiments, one or more of a BIOS, operating system, or application may set one or more interconnect protocols for the one or more of the connectors 107 without user interaction. For example, a device coupled to the connectors 107 may be detected, e.g. via a signal from the device or a polling of the interface 105. One or more of the BIOS, operating system, and application may determine an appropriate interconnect protocol for the connectors 107 based on the detection, and configure one or more of the interface logic 110, interface 105, and connectors 107 accordingly. Embodiments are not limited in this manner.

In embodiments, the processor device 100 also includes memory logic 112, such as coherency and cache logic. The memory logic 112 may perform operations for a memory of the processor device 100, such as cache, or a different memory not on the same die as the processor device 100, for example. The memory logic 112 may enable a device coupled to the interface 105 via the connectors 107 to read and write data to and from memory. In some embodiments, the memory logic 112 may enable a coherency protocol for memory usage of the cores 115 of the processor device 100. Since there may be two or more processing elements or cores 115 working at the same time, it is possible that they simultaneously access the same memory location of a cache. If one of the cores 115 changes data in a memory location, the memory logic 112 may notify all the other cores 115 of changes to shared values in memory, for example. Embodiments are not limited in this manner, and any one of a number of coherency protocols may be utilized by the memory logic 112.

In embodiments, the processor device 100 also includes fuse logic 114 which may be used to set one or more interconnect protocols for the interface logic 110. The fuse logic 114 may be on-die of the processor device 100 and user programmable. For example, the fuse logic 114 may be coupled to a fuse mapping to individual fuse buses to interact and program one or more fuses. The fuses may be set and control which of the interconnect protocols are enabled and provided by the interface logic 110 for each of the one or more connectors 107. For example, the fuse logic 114 may program one or more fuses to enable one or more of a serial link protocol, a coherent link protocol, and an accelerator link protocol for the connectors 107. The fuse logic 114 may program one or more fuses based on user input. For example, the fuses to configure an interconnect protocol for the interface logic 110 may be programmed by a user at the time of manufacturer or during run-time. In another example, a user may program the fuses to set an interconnect protocol for the interface logic 110 via at least one of a BIOS, an operating system, and an application. The fuse logic 114 may also program one or more fuses to set an interconnect protocol based on signals received from the BIOS, an application, or operating system directly. In some instances, a discovery operation may occur to detect a device or a card to configure the interface logic 110. The discovery operation may include automatically detecting a card or device plugged into a slot, for example. In another example, platform straps may be used to determine a configuration of the interface logic 110. The platform straps may include detecting signalling on one or more pins during a bootup, for example.

In some embodiments, a combination of one or more methods maybe used to configure the interface logic 110. For example, fuse logic 114 and a discovery operation maybe used to set the interface logic 110. Fuses might be used to enable a link as PCIe/OAP (i.e. Flexbus® with no UPI) link, and an auto discovery operation can be used to determine if an attached device is PCIe or OAP. Note that in some instances, the fuse logic 114 may also be used to disable or disallow certain interconnect protocols. A fuse could, for example, prevent a link being transition to an OAPmode or UPI mode. Therefore effectively render a link PCIe only.

Figure 2A:
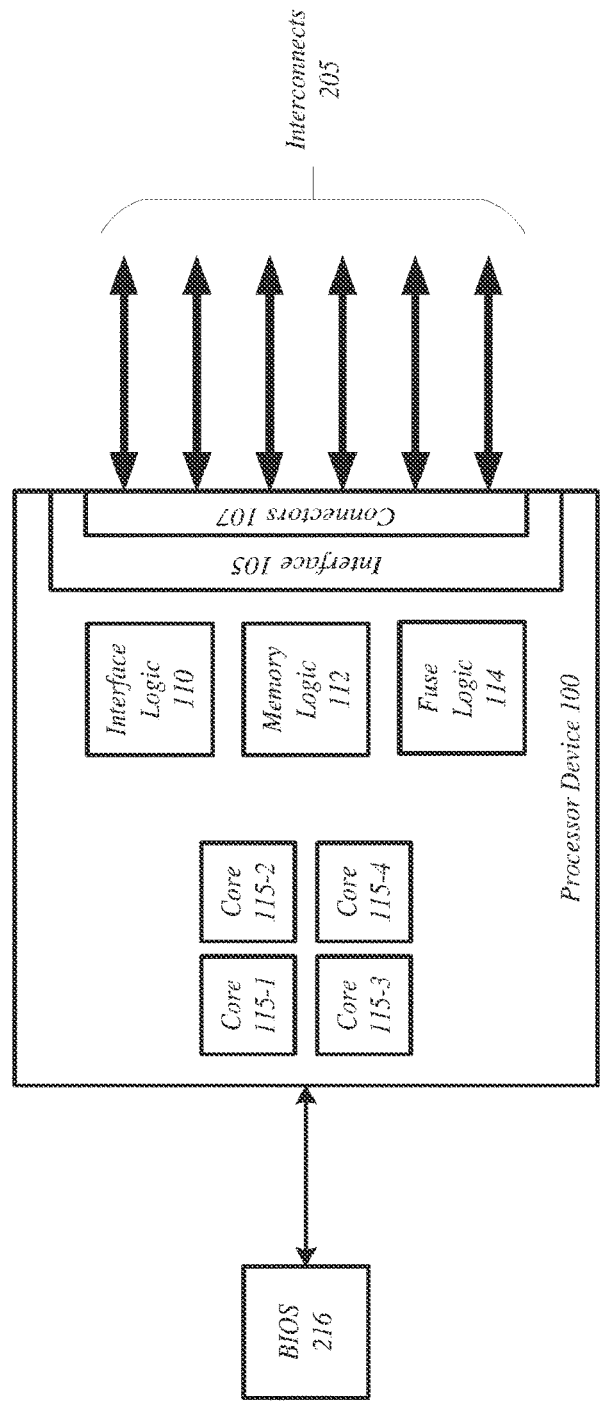
FIGS. 2A-2D illustrate examples of a computer system.

FIGS. 2A-2D illustrates various configurations of a computer system 200 having one or more interconnect protocols enabled for a processor device 100. FIG. 2A illustrates computer system 200 having a processor device 100 coupled with a BIOS 216 and a plurality of interconnects 205, which may include a number of lanes over the connectors 107 or pins. The interconnects 205 may be logical connections coupling one or more other devices, components, elements, and so forth with the processor device 100.

In embodiments, the interconnects 205 may operate in accordance with the one or more interconnect protocols, e.g. a serial link protocol, a coherent link protocol, and an accelerator link protocol. Moreover, the interconnects 205 may include a serial link interconnect and operate in accordance with a serial link protocol, a coherent link interconnect and operate in accordance with a coherent link protocol, an accelerator link interconnect and operate in accordance with an accelerator link protocol, and so forth.

Figure 2B:
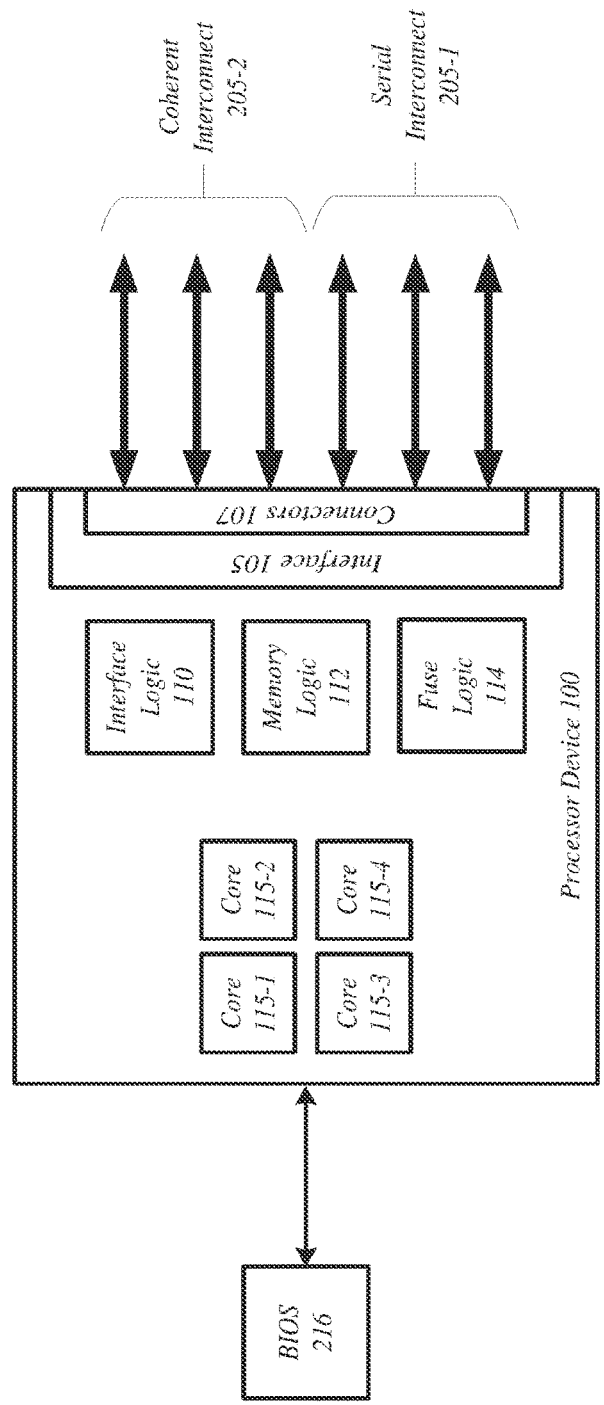

FIG. 2B illustrates one example configuration of a computer system 200 having a number of connectors 107 set to operate as a serial interconnect 205-1 and a coherent interconnect 205-2. The serial interconnect 205-1 may include a number of lanes, such as sixteen (16) lanes for PCIe providing thirty-two (32) Gigabytes (GB)/second (s) bandwidth or throughput. Similarly, the coherent interconnect 205-2 may include a number of lanes, such as twenty-four (24) to provide 40.8 GB/s throughput. In this configuration, the interface logic 110 may enable communication of data via the serial interconnect 205-1 in accordance with a serial link protocol and via the coherent interconnect 205-2 in accordance with a coherent link protocol. This configuration may be based on setting one or more fuses by the fuse logic 114. Moreover, the settings may be set at a time of manufacturer by programming one or more fuses (or antifuses) by using known programming techniques, such as "blowing" one or more fuses by applying a high voltage pulse. In some embodiments, the settings may be set at run-time or boot time of the computer system 200 by configuring information in the BIOS 216, a operating system configuration, or an application configuration. The settings may be set statically or dynamically. In another example, the configuration may be hardcoded into the BIOS 216 or the configuration could be stored in a configuration read-only memory (ROM) and passed to the BIOS 216 by power management code. Embodiments are not limited in this manner. Note that FIG. 2B illustrates only one of many different configurations that may be applied to the interconnects 205.

Figure 2C:
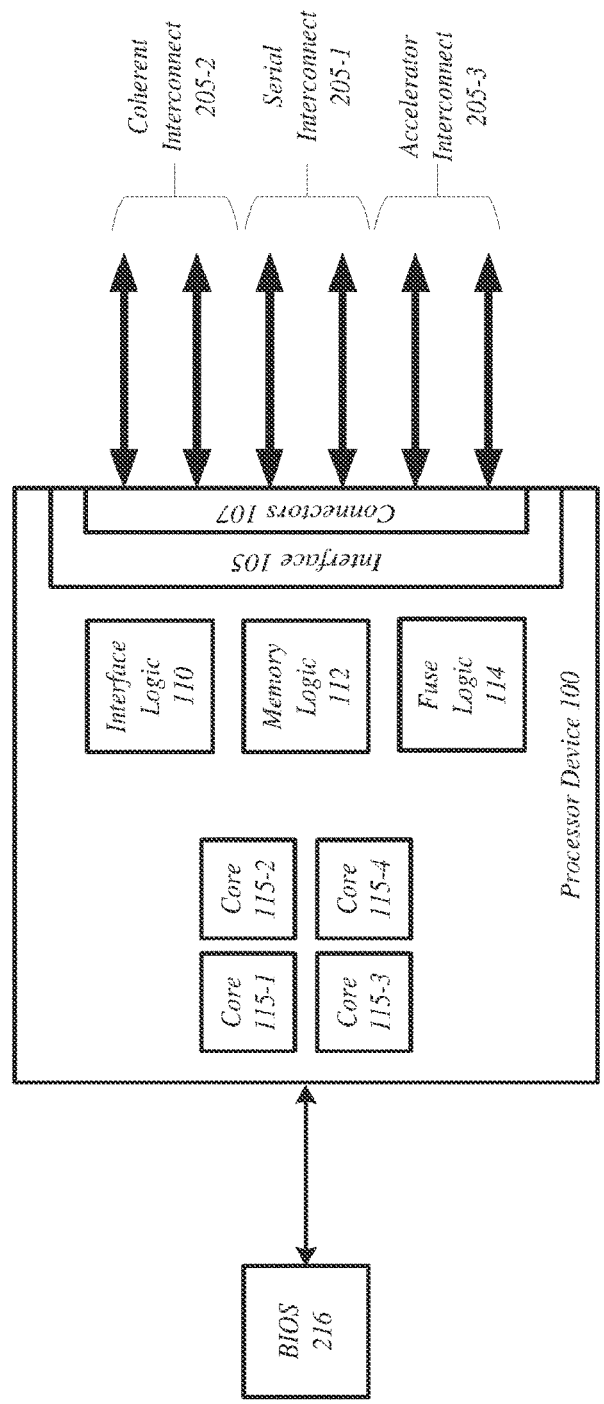

For example, FIG. 2C illustrates another example configuration of a computer system 200 having a number of connectors 107 set to operate as a serial interconnect 205-1, a coherent interconnect 205-2, and an accelerator interconnect 205-3. The serial interconnect 205-1 and coherent interconnect 205-2 may include a number of lanes as previously discussed. The accelerator interconnect 205-3 may also include a number of lanes, such as twenty-six (26) providing forty-eight (48) GB/sec throughput. In this configuration, the interface logic 110 may enable communication of data via the serial interconnect 205-1 in accordance with a serial link protocol, via the coherent interconnect 205-2 in accordance with a coherent link protocol, and via the accelerator interconnect 205-3 in accordance with an accelerator link protocol. This configuration may be based on setting one or more fuses by the fuse logic 114.

Figure 2D:
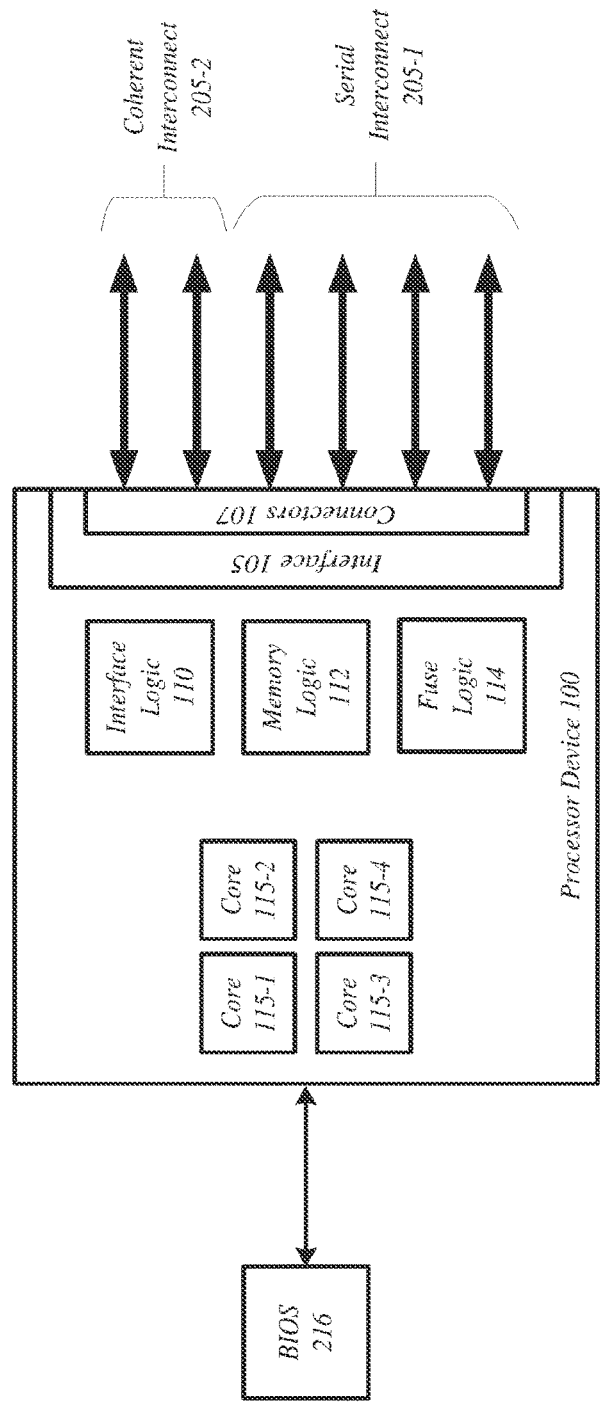

FIG. 2D illustrates another example configuration of a computer system 200 having a number of connectors 107 programmed to operate as a serial interconnect 205-1. In this illustrated example, the serial interconnect 205-1 may provide additional lanes compared to what is illustrated in FIGS. 2B and 2C. The additional lanes configured as a serial interconnect 205-1 may provide additional bandwidth for additional devices to couple with the processor device 100 via serial links. For example, the serial interconnect 205-1 illustrated in FIG. 2D may enable two or more devices to couple with processor device 100 via serial interconnects 205-1. Further, the serial interconnect 205-1 in FIG. 2D may provide two sets of 16 lanes, each operating at 32 GB/s, for example. As previously discussed, the interconnects 205-1 and 205-2 may be programmed and reprogrammed statically and dynamically and based on setting one or more fuses by the fuse logic 114, for example. Embodiments are not limited to these examples illustrated in FIGS. 2A-2D. Other configurations may be set statically or dynamically based on the needs of a user or manufacture for a computer system.

FIG. 3A illustrate an embodiment of a interconnect protocol stack 300. The interconnect protocol stack 300 may generally include or represent the previously discussed interconnect protocols, e.g. a serial link protocol, a coherent link protocol, and an accelerator link protocol. Embodiments are not limited in this manner.

The interconnect protocol stack 300 may include a number of layers, such as a transaction layer 302, a link layer 304, and a physical layer (PHY) 306. In embodiments, portions of the interconnect protocol stack 300 may be implemented as part of the interface logic 110, the interface 105, connectors 107, or combination thereof. However, embodiments are not limited in this manner, and portions of the interconnect protocol stack 300 may be implemented in different elements of the processor device 100.

In some embodiments, the interconnect protocol stack 300 and interconnect protocols may communicate data between the coherent fabric 310 and a device. The coherent fabric 310 may connect and include the cores 115, the memory logic 112, memory, the processor cache, and so forth with the interface logic 110. The coherent fabric 310 may include protocol agents, as will be discussed in more detail below in FIG. 3B. The transaction layer 306 may handle data and action requests and messages. The transaction layer 306 may parse the action requests and messages and initiates the appropriate actions in the processor's memory system according to protocol specific rules, such as ordering rules. The transaction layer 306 may also process data and action requests which may include read and write instructions. Action requests may also include cache coherency actions for UPI and OAP, for example, and address transaction actions for PCIe, for example. The messages processed by the transaction layer 306 may include error messages, interrupts, and so forth.

The transaction layer 306 may provide an interface between the one or more cores 115, and interconnect architecture including at least portions of the PHY layer 302, which may include the interface 105, and connectors 107 coupled to another device. The transaction layer 306 may also communicate information between the cores 115 and the processor's memory system and another device via the link layer 304 and PHY layer 302 in transaction layer packets (TLPs). As mentioned, this information may include memory reads, memory writes, input/output (I/O), I/O writes, messages, completion, and so forth.

The link layer 304, also referred to as a data link layer, acts as an intermediate stage between the transaction layer 306 and the PHY 302. In one embodiment, the link layer 304 may provide a reliable mechanism for exchanging TLPs between two components in a link. The link layer 304 may append information, e.g. packet sequence identification, to the TLPs when sending data and may remove the information from packets when receiving data. The link layer 304 may also determine and append an error detection code (CRC) to the packet header/payload of the TLPs. The link layer 304 sends the modified TLPs to the PHY 306 for transmission across a physical, e.g. interface 105 and connectors 107, to an external device.

In one embodiment, the interconnect protocol stack 300 may also include a PHY 302, which may include a logical sub-block 314 and an electrical sub-block 318 to physically transmit a packet to an external device. In some embodiments, the PHY 302 may include portions of the interface logic 110, the interface 105, and the connectors 107 or pins, as illustrated in FIGS. 1 and 2A-2D.

In some instances, the logical sub-block 314 may be divided into a media access control (MAC) sublayer and a physical coding sublayer (PCS). In some instances, the PHY Interface for PCI Express (PIPE), published by Intel® Corp., defines the MAC/PCS functional partitioning and the interface between these two sub-layers. The PIPE specification also identifies the physical media attachment (PMA) layer, which includes the serializer/deserializer (SerDes) circuitry and other analog circuitry.

The logical sub-block 314 may also responsible for the logical functions of the PHY 302. The logical sub-block 314 includes a buffer that may function either as a drift buffer or an elastic buffer. Further, the logical sub-block 314 includes a data encoding section, which can encode data using a 128b/130b transmission code, where 130-bit symbols are transmitted/received. In some embodiments, the logical sub-block 314 includes a transmit section to prepare outgoing information for transmission by electrical sub-block 318, and a receiver section to identify and prepare received information before passing it to the link layer 304. The electrical sub-block 318 includes a transmitter and a receiver to send and receive data. The transmitter is supplied by logical sub-block 314 with symbols and transmits on to an external device. The receiver is supplied with symbols from an external device and transforms the received signals into a bit-stream. The bit-stream is supplied to the logical sub-block 314.

Figure 3B:
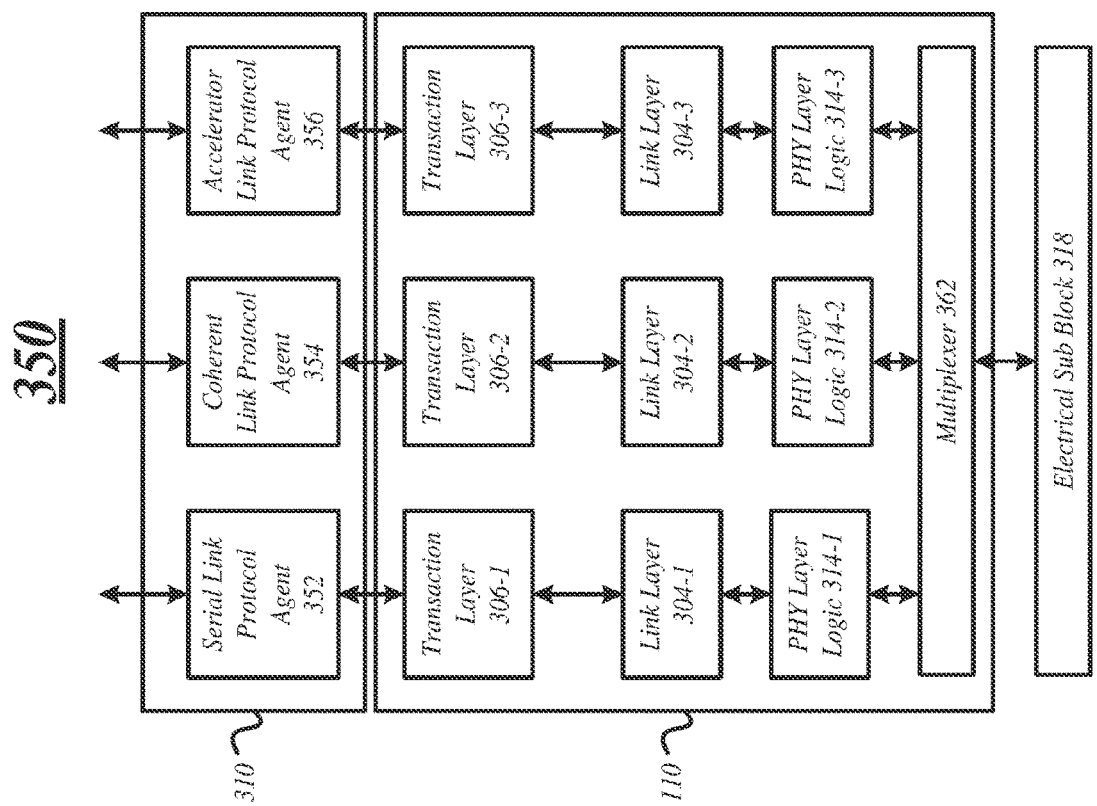
FIG. 3B illustrates an example of another interconnect protocol layer system.

FIG. 3B illustrates an embodiment of an interconnect block diagram 350 to support multiple interconnect protocols on a common set of pins or connectors 107 for a processor device 100. In the illustrated example, the interface logic 110 may control and determine one or more interconnect protocols, e.g. a serial link protocol, a coherent link protocol, and an accelerator link protocol, to support sending and receiving information and data between the coherent fabric 310 components and another device coupled via the PHY layer 302. In embodiments, each interconnect protocol may include a separate interconnect protocol stack having a transaction layer 306, a link layer 304 and at least a portion of the PHY layer, i.e. the PHY layer logic 314 or Logical PHY. The interconnect protocols may share the electrical sub-block 318, i.e. the Analog PHY, of the PHY layer 302. Further, a multiplexer 362 may be between the electrical sub block 318 and each of the interconnect protocols stacks to direct information and data to the appropriate interconnect protocol stack based on a configuration, as previously discussed.

In embodiments, each of the interconnect protocol stacks may be coupled with a protocol agent which may be part of the coherent fabric 310. The protocol agents, including but not limited to, a serial link protocol agent 352, a coherent link protocol agent 354, and an accelerator link protocol agent 356 may be activated and deactivated based on the configuration, as discussed above. Activating a protocol agent may set up various protocol maps and routing tables in the coherent fabric 310 to steer action requests and messages associated with the selected protocol to the activated protocol agent and steer action requests and messages from the activated protocol agent to other components of the coherent fabric 310, e.g. cores 115, processor cache, memory logic 112, memory, and so forth.

In one example, if the serial link protocol agent 352 is activated, one or more protocol maps and routing tables may be configured to send action requests and messages from components of the coherent fabric 310 to the serial link protocol agent 352 for further processing by the serial link protocol stack. The serial link protocol stack may include the transaction layer 306-1, the link layer 304-1, the PHY layer logic 314-1. The layers 306-1, 304-1, and 314-1 may process information and cause communication to another device via the electrical sub-block 318 over one or more connectors 107. Similarly, information received via one or more connectors 107 configured for a serial link may be processed by electrical sub-block 318, PHY layer logic 314-1, link layer 304-1, and the transaction layer 306-1. The serial link protocol agent 352 may send the information including action requests and messages to components of the coherent fabric 310.

In a second example, the coherent link protocol agent 354 and coherent link stack may process information in a similar manner as the serial link protocol agent 352. For example, when the coherent link protocol agent 354 is activated, one or more protocol maps and routing tables are configured to send information from the components of the coherent fabric 310 to the coherent link protocol agent 354 for processing by the transaction layer 306-2, link layer 304-2, the PHY layer logic 314-2, and for communication via a device coupled with connectors 107 via the electrical sub block 318. Information received via the connectors 107 configured for a coherent link may be processed by electrical sub block 318, PHY layer logic 314-2, link layer 304-2, and the transaction layer 306-2. The coherent link protocol agent 354 may send the information including action requests and messages to components of the coherent fabric 310.

The accelerator link protocol agent 356 may operate in a similar manner when activated. Information from the components of the coherent fabric 310 sent to the accelerator link protocol agent 356 may be processed by the transaction layer 306-3, link layer 304-3, the PHY layer logic 314-3, and communicated to a device coupled with connectors 107 via the electrical sub-block 318. Information received via the connectors 107 configured for an accelerator link may be processed by electrical sub-block 318, PHY layer logic 314-3, link layer 304-3, and the transaction layer 306-3. The accelerator link protocol agent 356 may send the information including action requests and messages to components of the coherent fabric 310.

As previously discussed, the configuration of the interface logic 110 may be determined by setting one or more fuses in the fuse logic 114. In some embodiments, interface logic 110 includes a multiplexer 362 configured to cause the application of a particular interconnect protocol for particular connectors 107 based on one or more settings in fuse logic 114, for example. More specifically, one or more fuses (or antifuses) may be set and configure the multiplexer and activate the serial link protocol agent 352 to send and receive data via the first set of connectors 107. In another example, one or more fuses (or antifuses) may be set to activate a coherent link protocol agent 354 and configure a multiplexer 362 to send and receive data via the second set of connectors 107. In the third example, one or more fuses (or antifuses) may be set to activate an accelerator link protocol agent 356 and configure a multiplexer 362 to communicate information via the third set of connectors 107. Embodiments are not limited to these examples, and different interconnect protocols may be applied to one or more of the sets of connectors 107. Moreover, the fuse logic 110 may be configured such that one or more of the protocol agents are deactivated. These fuses and configurations may be changed and reprogrammed to cause different interconnect protocols to be applied to one or more sets of the connectors 107.

In operation, a processor device 100 may receive data or information via one or more connectors 107 from a coupled device. A coupled device may be any type of device that may send information to a processor device 100 for processing by one or more cores 115 and a coherent fabric that may connect the cores 115, the processor's memory system including the memory logic 112 and memory, the interface logic 110 and interconnect protocol stack. The PHY layer 302 may receive the data or information and process it in accordance with the appropriate interconnect protocol stack. The interconnect protocol stack used may be based on the one or more connectors 107 or pins on which the data or information was received on and the multiplexer 362.

The PHY layer logic 314 may receive the information or data and perform decoding and descramble to ensure the integrity of the information or data is maintained. Different interconnect protocols may use different encoding/decoding techniques to ensure bit integrity. For example, PCIe 2.0 utilizes 8b/10b encoding meaning that for every eight payload bits or encoded with ten encoded bits to transmit data, causing a 20% overhead. In another example, PCIe 3.0 utilizes 128b/130b encoding using less overhead. The PHY layer logic 314 may perform processing based on the interconnect protocol utilized. Embodiments are not limited in this manner.

The PHY layer logic 314 may pass or send the data or information to other layers of the interconnect protocol stacks, such as the link layer 304 and the transaction layer 306 for further processing. Each of the layers may process the data or information and in accordance with a particular interconnect protocol. The information or data may be sent to an appropriate protocol agent and coherent fabric 310 for processing.

In a similar manner, a processor device 100 may send or communicate data or information to another device. For example, information or data may be received by a coherent fabric 310 and an appropriate protocol agent based on configured mappings and routing tables. The information or data may be processed by the interconnect protocols layers including the transaction layer 306, the link layer 304, and the PHY layer logic 314, as previously discussed above. The information and data may be communicated to the destination device by the multiplexer 362 and the electrical subblock 318 via the appropriate connectors 107.

Figure 4A:
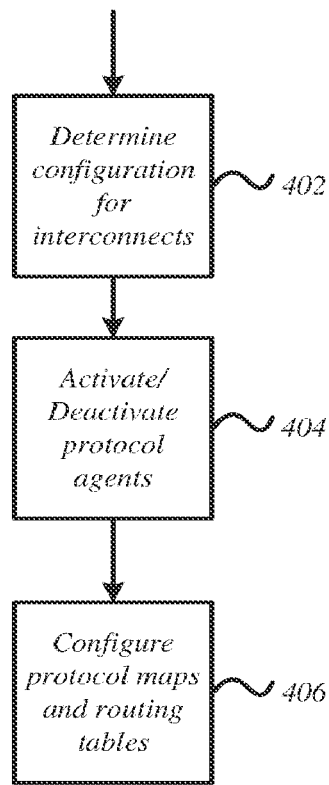
FIG. 4A illustrates an example of a first logic flow diagram.

FIG. 4A illustrates a first logic flow diagram 400 for configuring interface logic 110 and one or more connectors 107 with one or more interconnect protocols. Although logic flow diagram 400 illustrates certain operations are occurring in a particular order, embodiments are not limited in this manner. Some operations may occur before or after other operations, and some may occur in parallel. Moreover, the logic flow 400 may be representative of some or all of the operations executed by one or more embodiments described herein.

At block 402, embodiments include determining a configuration for interconnects and which interconnect protocols are active and de-active for one or more connectors. In embodiments, the determination may be made based on the configuration of fuse logic and the setting of one or more fuses. The configuration may also be determined based on a discovery operation performed to detect a card or device coupled with the interconnects. For example, a discovery operation may be performed and detect that a device is a PCIe device, an OAP device and so forth. In some embodiments, the configuration may also be determined or detected using platform straps which may include signaling on one or more pins or connectors during a bootup.

At block 404, the logic flow 400 includes activating and deactivating protocol agents based on the configuration of the system. For example, if the configuration includes having one or more connectors are to be configured as a serial link, the serial link protocol agent may be activated. Similarly, if one or more connectors 107 are to be configured as coherent link, the coherent link protocol agent is activated. The accelerator link protocol agent may be activated if one or more connectors are to be configured as an accelerator link. If the one or more connectors are not to be configured as a particular link, e.g. serial link, coherent link, and accelerator link, the corresponding protocol may be deactivated. For example, if the connectors are not to be configured as serial links, the serial link protocol agent may be activated.

At block 406, the logic flow 400 may include configuring one or more protocol maps and routing tables based on the active protocol agents. For example, protocol maps and routing tables may be configured to steer request and messages to the serial link protocol agent, and the appropriate interconnect protocol layers if one or more of the connectors are configured as a serial link. Similarly, protocol maps and routing tables may be configured to steer particular requests and messages to a coherent link protocol agent and an accelerator link protocol agent if one or more connectors are configured as coherent links and accelerator links. Embodiments are not limited in this manner.

FIG. 4B illustrates a second logic flow diagram 450 for receiving information via connectors and a third logic flow diagram 470 to send information to another device or component. Although logic flow diagrams 450, and 470 illustrate certain operations are occurring in a particular order, embodiments are not limited in this manner. Some operations may occur before or after other operations, and some may occur in parallel. Moreover, the logic flows 450 and 470 may be representative of some or all of the operations executed by one or more embodiments described herein.

At block 452, embodiment includes receiving information via an interface and one or more connectors. The data may be received from another device or component coupled with the one or more connectors, for example. At block 454, the logic flow 450 includes sending the information to the appropriate interconnect protocol stack. In one instance, interface logic may determine the interconnect protocol stack based on the connectors and a configuration, as discussed in FIG. 4A. In one example, the configuration may cause a multiplexer to steer the information to the appropriate interconnect protocol stack. For example, the information may be sent to a serial link protocol stack based on a configuration and processed by the PHY layer, a link layer, and a transaction layer associated with the serial link protocol stack. At block 458, the data may be processed in accordance with the interconnect protocol. Similarly, the coherent protocol stack and the accelerator protocol stack may be utilized based on the configuration.

At block 456, the information may be processed by the PHY layer, the link layer, and the transaction, as discussed in FIGS. 3A and 3B. Also, the protocol agent for the interconnect protocol stack may determine one or more components of the coherent fabric to send the information. For example, embodiments may include communicating information to cores, memory, memory logic, and so forth. At block 458, information may be sent to the components of the coherent fabric.

Logic flow 470 may include receiving information from components to send to a device coupled vid connectors. At block 472, a protocol agent may receive information, e.g. requests, messages, and so forth, to send to a device from a component of a coherent fabric. The protocol agent, which may be one of a serial link protocol agent, a coherent link protocol agent, and an accelerator link protocol agent may send the information to a corresponding interconnect protocol at block 474. The information may be processed by the transaction layer, the link layer, and the PHY layer at block 476 and communicated to the device at block 478.

FIG. 5 illustrates an example a first processing flow 500 for process data via one or more connectors. The processing flow 500 may be representative of some or all of the operations executed by one or more embodiments described herein. For example, the processing flow 500 is illustrated with the components illustrated in FIGS. 1 and 2A through 2D. However, embodiments are not limited in this manner.

At block 505, the processing flow 500 includes sending and receiving data via a plurality of connectors of a PHY layer interface. For example, data may be received from another device or component for processing by one or more cores for processing via the plurality of connectors. In another example, data may be sent to another device via the plurality of connectors. Embodiments are not limited in this manner.

At block 510, the logic flow 500 may include causing processing of the data for communication via a first subset of the plurality of connectors in accordance with a first interconnect protocol and causing processing of the data for communication via a second subset of the plurality of connector in accordance with a second interconnect protocol, the first interconnect protocol and the second interconnect protocol are different protocols and each comprising one of a serial link protocol, a coherent link protocol, and an accelerator link protocol.

Figure 6:
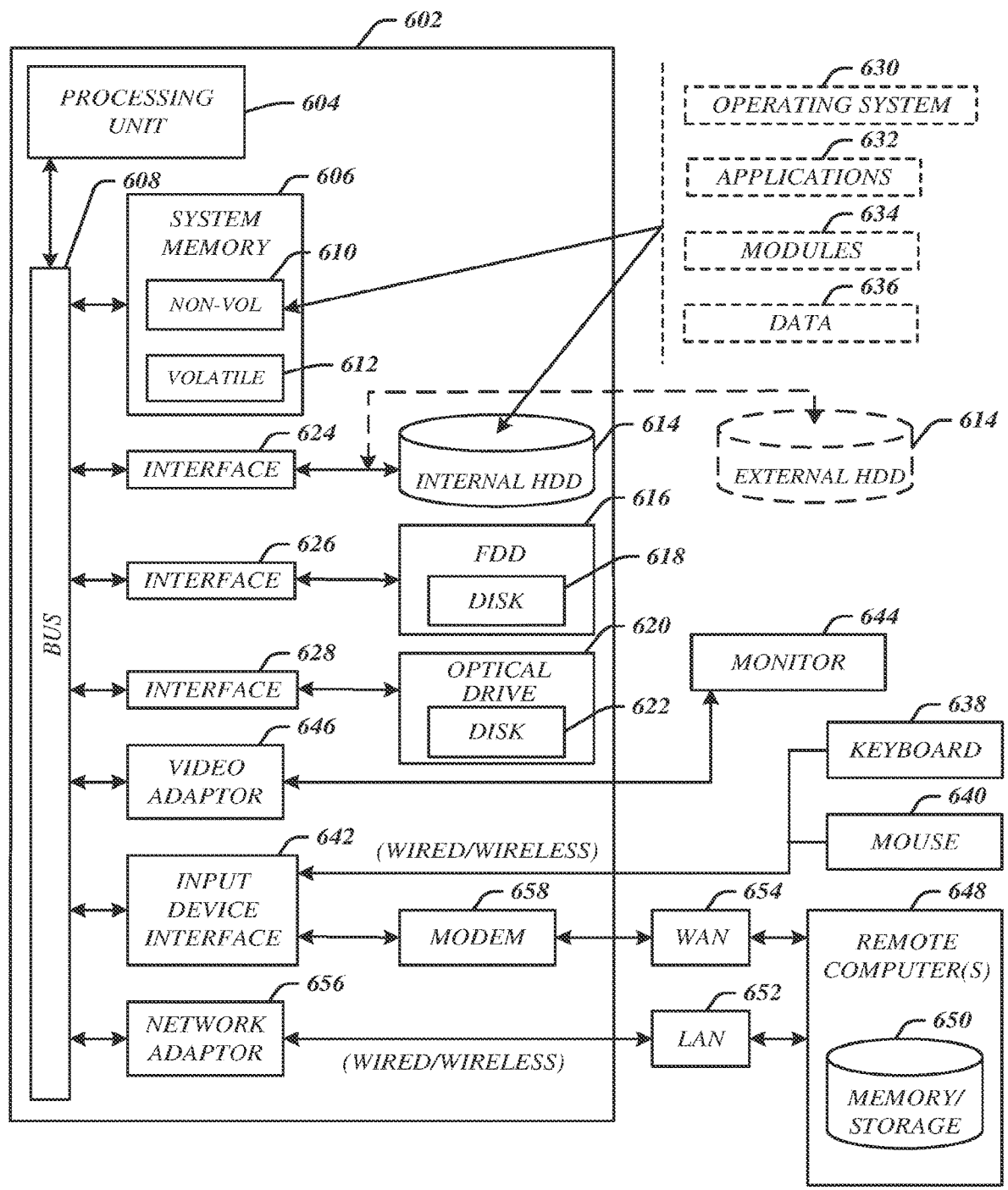
FIG. 6 illustrates an example of a computer architecture.

FIG. 6 illustrates an embodiment of an exemplary computing architecture 600 suitable for implementing various embodiments as previously described. In one embodiment, the computing architecture 600 may comprise or be implemented as part one or more systems and devices previously discussed.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described concerning the processing circuitry is shown in FIG. 1A.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and components of the system 100.

A user can enter commands and information into the computer 602 through one or more wired/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or another type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wired and wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN-networking environment, the computer 602 is connected to the LAN 652 through a wire and wireless communication network interface or adaptor 656. The adaptor 656 can facilitate wire and wireless communications to the LAN 652, which may also include a wireless access point disposed of thereon for communicating with the wireless functionality of the adaptor 656.

When used in a WAN-networking environment, the computer 602 can include a modem 658, or is connected to a communications server on the WAN 654, or has other means for establishing communications over the WAN 654, such as by way of the Internet. The modem 658, which can be internal or external and a wire and wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed of in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements and components as previously described with reference to FIGS. 1-5 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, a device, an apparatus, and so forth may include a physical (PHY) layer interface comprising a plurality of connectors configured to couple with one or more other devices, and to send and receive data via the plurality of connectors, and interface logic coupled with the PHY layer interface, the interface logic to cause processing of the data for communication via a first subset of the plurality of connectors in accordance with a first interconnect protocol and to cause processing of the data for communication via a second subset of the plurality of connector in accordance with a second interconnect protocol, the first interconnect protocol and the second interconnect protocol are different protocols and each comprising one of a serial link protocol, a coherent link protocol, and an accelerator link protocol.

In a second example and in furtherance of the first example, a system, a device, an apparatus, and so forth may include the interface logic to cause processing of the data for communication via a third subset of the plurality of connectors in accordance with a third interconnect protocol, the third interconnect protocol different than the first interconnect protocol and the second interconnect protocol and the third interconnect protocol comprising one of the serial link protocol, the coherent link protocol, and the accelerator link protocol.

In a third example and in furtherance of the previous examples, a system, a device, an apparatus, and so forth may include fuse logic, and one or more fuses coupled with the interface logic, the one or more fuses programmable to associate the first interconnect protocol with the first subset of the plurality of connectors and to associated the second interconnect protocol with the second subset of the plurality of connectors.

In a fourth example and in furtherance of the previous examples, a system, a device, an apparatus, and so forth may include the one or more fuses statically programmable to prevent changes to which interconnect protocols are associated with particular subsets of the plurality of connectors.

In a fifth example and in furtherance of the previous examples, a system, a device, an apparatus, and so forth may include the one or more fuses reprogrammable to associate a third interconnect protocol with at least one of the first subset of the plurality of connectors and the second subset of the plurality of connectors, the third interconnect protocol different than at least one of the first interconnect protocol and the second interconnect protocol.

In a sixth example and in furtherance of the previous examples, a system, a device, an apparatus, and so forth may include the interface logic to cause processing of the data for communication via the plurality of connectors in accordance with the first interconnect protocol and the second interconnect protocol based on a setting in a Basic Input/Output System (BIOS).

In a seventh example and in furtherance of the previous examples, a system, a device, an apparatus, and so forth may include the BIOS, and one or more fuses coupled with the BIOS, the one or more fuses programmable to associate the first interconnect protocol with the first subset of the plurality of connectors and the second interconnect protocol with the second subset of the plurality of connectors.

In an eighth example and in furtherance of the previous examples, a system, a device, an apparatus, and so forth may include the interface logic to associate the first interconnect protocol with the first subset of the plurality of connectors and the second interconnect protocol with the second subset of the plurality of connectors based on a signal generated based on a first device coupled with eth first subset and a second device coupled with the second subset.

In a ninth example and in furtherance of the previous examples, a system, a device, an apparatus, and so forth may include the interface logic to dynamically change at least one of an association of the first interconnect protocol with the first subset of the plurality of connectors and the second interconnect protocol with the second subset of the plurality of connectors to a different interconnect protocol based on a signal generated by an application during run-time.

In a tenth example and in furtherance of the previous examples, embodiments may include a non-transitory computer-readable storage medium, comprising a plurality of instructions, that when executed, enable processing circuitry to determine a configuration for a plurality of connectors, the configuration to associate a first interconnect protocol with a first subset of the plurality of connectors and a second interconnect protocol with a second subset of the plurality of connectors, the first interconnect protocol and the second interconnect protocol are different interconnect protocols and each comprising one of a serial link protocol, a coherent link protocol, and an accelerator link protocol, cause processing of data for communication via the first subset of the plurality of connectors in accordance with the first interconnect protocol, and cause processing of data for communication via the second subset of the plurality of connector in accordance with the second interconnect protocol.

In an eleventh example and in furtherance of the previous examples, embodiments may include a non-transitory computer-readable storage medium, comprising a plurality of instructions, that when executed, enable processing circuitry to associate a third interconnect protocol with a third subset of the plurality of connectors based on the configuration, the third interconnect protocol different than the first interconnect protocol and the second interconnect protocol and the third interconnect protocol comprising one of the serial link protocol, the coherent link protocol, and the accelerator link protocol, and cause processing of data for communication via the third subset of the plurality of connectors in accordance with the third interconnect protocol.

In a twelfth example and in furtherance of the previous examples, embodiments may include a non-transitory computer-readable storage medium, comprising a plurality of instructions, that when executed, enable processing circuitry to detect one or more fuses to determine the configuration to associate the first interconnect protocol with the first subset of the plurality of connectors and to associated the second interconnect protocol with the second subset of the plurality of connectors.

In a thirteenth example and in furtherance of the previous examples, embodiments may include a non-transitory computer-readable storage medium, wherein the one or more fuses are statically programmable to prevent changes to which interconnect protocols are associated with particular subsets of the plurality of connectors.

In a fourteenth example and in furtherance of the previous examples, embodiments may include a non-transitory computer-readable storage medium, wherein one or more fuses reprogrammable to associate a different interconnect protocol with at least one of the first subset of the plurality of connectors and the second subset of the plurality of connectors, the different interconnect protocol different than at least one of the first interconnect protocol and the second interconnect protocol.

In a fifteenth example and in furtherance of the previous examples, embodiments may include a non-transitory computer-readable storage medium, comprising a plurality of instructions, that when executed, enable processing circuitry to determine the configuration based on a setting in a Basic Input/Output System (BIOS) or in a read-only memory.

In a sixteenth example and in furtherance of the previous examples, embodiments may include a non-transitory computer-readable storage medium, comprising a plurality of instructions, that when executed, enable processing circuitry to associate the first interconnect protocol with the first subset of the plurality of connectors and the second interconnect protocol with the second subset of the plurality of connectors based on a signal generated from a first device coupling with the first subset and a second device coupling with the second subset.

In a seventeenth example and in furtherance of the previous examples, embodiments may include a non-transitory computer-readable storage medium, comprising a plurality of instructions, that when executed, enable processing circuitry to dynamically change at least one of an association of the first interconnect protocol with the first subset of the plurality of connectors and the second interconnect protocol with the second subset of the plurality of connectors to a different interconnect protocol based on a signal generated by an application during run-time.

In an eighteenth example and in furtherance of the previous examples, embodiments may include a computer-implemented method including determining a configuration for a plurality of connectors, the configuration to associate a first interconnect protocol with a first subset of the plurality of connectors and a second interconnect protocol with a second subset of the plurality of connectors, the first interconnect protocol and the second interconnect protocol are different interconnect protocols and each comprising one of a serial link protocol, a coherent link protocol, and an accelerator link protocol, causing processing of data for communication via the first subset of the plurality of connectors in accordance with the first interconnect protocol, and causing processing of data for communication via the second subset of the plurality of connector in accordance with the second interconnect protocol.

In a nineteenth example and in furtherance of the previous examples, embodiments may include a computer-implemented method including associating a third interconnect protocol with a third subset of the plurality of connectors based on the configuration, the third interconnect protocol different than the first interconnect protocol and the second interconnect protocol and the third interconnect protocol comprising one of the serial link protocol, the coherent link protocol, and the accelerator link protocol, and causing processing of data for communication via the third subset of the plurality of connectors in accordance with the third interconnect protocol.

In a twentieth example and in furtherance of the previous examples, embodiments may include a computer-implemented method including detecting one or more fuses to determine the configuration to associate the first interconnect protocol with the first subset of the plurality of connectors and to associated the second interconnect protocol with the second subset of the plurality of connectors.

In a twenty-first example and in furtherance of the previous examples, embodiments may include a computer-implemented method wherein the one or more fuses are statically programmable to prevent changes to which interconnect protocols are associated with particular subsets of the plurality of connectors.

In a twenty-second example and in furtherance of the previous examples, embodiments may include a computer-implemented method wherein one or more fuses reprogrammable to associate a different interconnect protocol with at least one of the first subset of the plurality of connectors and the second subset of the plurality of connectors, the different interconnect protocol different than at least one of the first interconnect protocol and the second interconnect protocol.

In a twenty-third example and in furtherance of the previous examples, embodiments may include a computer-implemented method including determining the configuration based on a setting in a Basic Input/Output System (BIOS) or in a read-only memory.

In a twenty-fourth example and in furtherance of the previous examples, embodiments may include a computer-implemented method including associating the first interconnect protocol with the first subset of the plurality of connectors and the second interconnect protocol with the second subset of the plurality of connectors based on a signal generated from a first device coupling with the first subset and a second device coupling with the second subset.

In a twenty-fifth example and in furtherance of the previous examples, embodiments may include a computer-implemented method including dynamically changing at least one of an association of the first interconnect protocol with the first subset of the plurality of connectors and the second interconnect protocol with the second subset of the plurality of connectors to a different interconnect protocol based on a signal generated by an application during run-time.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture? It is, of course, not possible to describe every conceivable combination of components and methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:
1. An apparatus comprising:
a package including a plurality of integrated circuit dies,
one or more of the plurality of integrated circuit dies including:
a memory controller to couple to a memory device;

a plurality of processing cores to execute instructions and process data;
a coherent interconnect fabric to couple the plurality of processing cores and the memory controller;
physical (PHY) interface circuitry comprising:
   a plurality of connectors to couple the PHY interface circuitry to a plurality of data lanes, the plurality of connectors including a first subset of the connectors associated with a first interconnect protocol, a second subset of the connectors associated with a second interconnect protocol, and a third subset of the connectors associated with a third interconnect protocol;
   a first sub-block including a first physical coding sub-layer (PCS) to encode data in accordance with the first interconnect protocol for communication over the first subset of connectors;
   a second sub-block including a second PCS to encode data in accordance with the second interconnect protocol for communication over the second subset of connectors;
   a third sub-block including a third PCS to encode data in accordance with the third interconnect protocol for communication over the third subset of connectors;
   a multiplexer operable based on a physical or logical control input to connect the first subset of connectors to the first sub-block, to connect the second subset of the connectors to the second sub-block, and to connect the third subset of the connectors to the third sub-block;
first protocol layer circuitry to provide data received from the coherent interconnect fabric to the first sub-block and to provide data received from the first sub-block to the coherent interconnect fabric in accordance with the first interconnect protocol;
second protocol layer circuitry to provide data received from the coherent interconnect fabric to the second sub-block and to provide data received from the second sub-block to the coherent interconnect fabric in accordance with the second interconnect protocol; and
third protocol layer circuitry to provide data received from the coherent interconnect fabric to the third sub-block and to provide data received from the third sub-block to the coherent interconnect fabric in accordance with the third interconnect protocol.

2. The apparatus of claim 1 wherein the physical or logical control input comprises a configuration signal received from a basic input-output system (BIOS) of a computer system.

3. The apparatus of claim 1 wherein the physical or logical control input comprises a configuration signal based on a setting of one or more fuses.

4. The apparatus of claim 1 wherein the physical or logical control input is generated based on a discovery operation performed by firmware and/or software of a computer system.

5. The apparatus of claim 1 wherein the coherent interconnect fabric comprises a first agent to communicate with the first one or more protocol layer circuitry in accordance with the first interconnect protocol.

6. The apparatus of claim 5 wherein the coherent interconnect fabric comprises a second agent to communicate with the second one or more protocol layer circuitry in accordance with the second interconnect protocol.

7. The apparatus of claim 1 wherein the first interconnect protocol comprises a serial link protocol and the first subset of connectors are to perform serial input/output (TO) communication.

8. The apparatus of claim 7 wherein the second interconnect protocol comprises a memory protocol and the second subset of connectors are coupled to a second serial interconnect supporting remote memory access.

9. A method comprising:
   providing a package including a plurality of integrated circuit dies, one or more of the plurality of integrated circuit dies including a memory controller to couple to a memory device, a plurality of processing cores to execute instructions and process data, and a coherent interconnect fabric to couple the plurality of processing cores and the memory controller;
   associating a first subset of connectors of a physical (PHY) interface circuit with a first interconnect protocol;
   associating a second subset of connectors of a physical (PHY) interface circuit with a second interconnect protocol;
   associating a third subset of connectors of a physical (PHY) interface circuit with a third interconnect protocol;
   connecting, via a multiplexer based on a physical or logical control input, a first sub-block including a first physical coding sub-layer (PCS) to the first subset of connectors, a second sub-block including a second PCS to the second subset of connectors, and a third sub-block including a third PCS to the third subset of connectors;
   encoding data by the first PCS, second PCS, and third PCS in accordance with the first, second, and third interconnect protocols, respectively, for communication over the first, second, and third subset of connectors, respectively;
   providing, by first protocol layer circuitry, data received from the coherent interconnect fabric to the first sub-block in accordance with the first interconnect protocol;
   providing, by the first protocol layer circuitry, data received from the first sub-block to the coherent interconnect fabric in accordance with the first interconnect protocol;
   providing, by second protocol layer circuitry, data received from the coherent interconnect fabric to the second sub-block in accordance with the second interconnect protocol;
   providing, by the second protocol layer circuitry, data received from the second sub-block to the coherent interconnect fabric in accordance with the second interconnect protocol;
   providing, by third protocol layer circuitry, data received from the coherent interconnect fabric to the third sub-block in accordance with the third interconnect protocol; and
   providing, by the third protocol layer circuitry, data received from the third sub-block to the coherent interconnect fabric in accordance with the third interconnect protocol.

10. The method of claim 9 wherein the physical or logical control input comprises a configuration signal received from a basic input-output system (BIOS) of a computer system.

11. The method of claim 9 wherein the physical or logical control input comprises a configuration signal based on a setting of one or more fuses.

12. The method of claim 9 wherein the physical or logical control input is generated based on a discovery operation performed by firmware and/or software of a computer system.

13. The method of claim 9 wherein the coherent interconnect fabric comprises a first agent to communicate with the first one or more protocol layer circuitry in accordance with the first interconnect protocol.

14. The method of claim 13 wherein the coherent interconnect fabric comprises a second agent to communicate with the second one or more protocol layer circuitry in accordance with the second interconnect protocol.

15. The method of claim 9 wherein the first interconnect protocol comprises a serial link protocol and the first subset of connectors are to perform serial input/output (IO) communication.

16. The method of claim 15 wherein the second interconnect protocol comprises a memory protocol and the second subset of connectors are coupled to a second serial interconnect supporting remote memory access.

17. A system comprising:
a system memory device;
a package including a plurality of integrated circuit dies, one or more of the plurality of integrated circuit dies including:
  a memory controller to couple to the system memory device;
  a plurality of processing cores to execute instructions and process data;
  a coherent interconnect fabric to couple the plurality of processing cores and the memory controller;
  physical (PHY) interface circuitry comprising:
    a plurality of connectors to couple the PHY interface circuitry to a plurality of data lanes, the plurality of connectors including a first subset of the connectors associated with a first interconnect protocol, a second subset of the connectors associated with a second interconnect protocol, and a third subset of the connectors associated with a third interconnect protocol;
    a first sub-block including a first physical coding sub-layer (PCS) to encode data in accordance with the first interconnect protocol for communication over the first subset of connectors;
    a second sub-block including a second PCS to encode data in accordance with the second interconnect protocol for communication over the second subset of connectors;
    a third sub-block including a third PCS to encode data in accordance with the third interconnect protocol for communication over the third subset of connectors;
    a multiplexer operable based on a physical or logical control input to connect the first subset of connectors to the first sub-block, to connect the second subset of the connectors to the second sub-block, and to connect the third subset of the connectors to the third sub-block;
    first protocol layer circuitry to provide data received from the coherent interconnect fabric to the first sub-block and to provide data received from the first sub-block to the coherent interconnect fabric in accordance with the first interconnect protocol;
    second protocol layer circuitry to provide data received from the coherent interconnect fabric to the second sub-block and to provide data received from the second sub-block to the coherent interconnect fabric in accordance with the second interconnect protocol; and
    third protocol layer circuitry to provide data received from the coherent interconnect fabric to the third sub-block and to provide data received from the third sub-block to the coherent interconnect fabric in accordance with the third interconnect protocol;
a network adaptor to couple the system to a wired or wireless network;
a storage interface coupled to the package;
a storage device coupled to the package via the storage interface; and
a display controller to couple to a display device.

18. The system of claim 17 wherein the physical or logical control input comprises a configuration signal received from a basic input-output system (BIOS) of a computer system.

19. The system of claim 17 wherein the physical or logical control input comprises a configuration signal based on a setting of one or more fuses.

20. The system of claim 17 wherein the physical or logical control input is generated based on a discovery operation performed by firmware and/or software of a computer system.

21. The system of claim 17 wherein the coherent interconnect fabric comprises a first agent to communicate with the first one or more protocol layer circuitry in accordance with the first interconnect protocol.

22. The system of claim 21 wherein the coherent interconnect fabric comprises a second agent to communicate with the second one or more protocol layer circuitry in accordance with the second interconnect protocol.

23. The system of claim 17 wherein the first interconnect protocol comprises a serial link protocol and the first subset of connectors are to perform serial input/output (TO) communication.

24. The system of claim 23 wherein the second interconnect protocol comprises a memory protocol and the second subset of connectors are coupled to a second serial interconnect supporting remote memory access.

* * * * *